6668X
G. CARRIEL.
CLEANING RAGS.
Patented July 27, 1831.
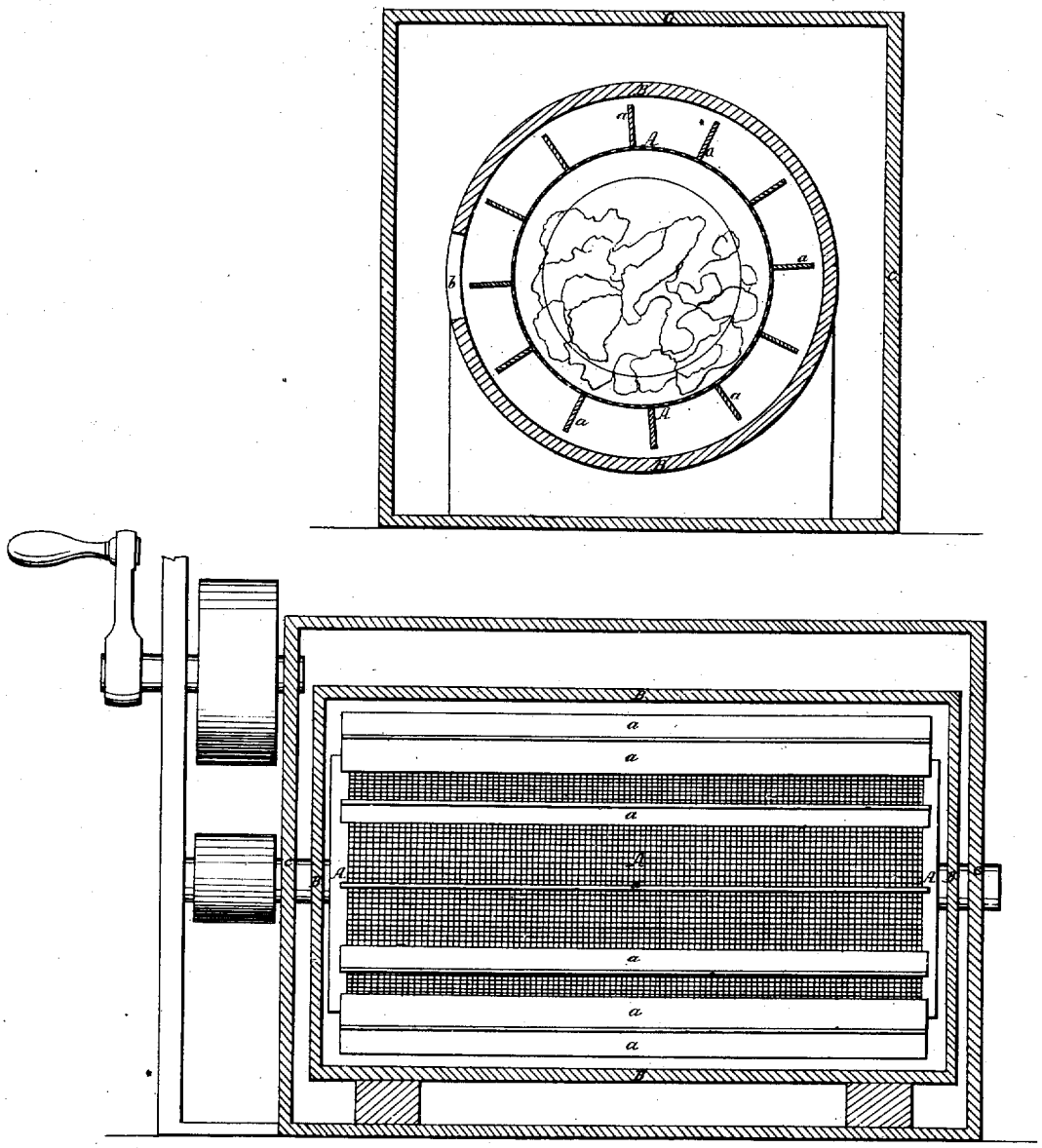
THE NORRIS PETERS CO., PHOTO-LITHO., WASHINGTON, D. C.

July 27 1831 6668X 159

George Carriel, of Manchester, State of Connecticut,

Letters Patent,

The schedule referred to in these Letters Patent & making part of the same containing a description in the words of the said George Carriel, himself of his improvement in the machine for cleaning rags, To all to whom these presents shall come, Be it known that I George Carriel of the town of Manchester in the county of Hartford, have invented a new and useful Improvement, in the cleaning of rags, and that the following is a full and exact description of the construction and operation of the said Machine as invented or improved by me, viz Take a common screen for cleaning rags used either with or without pins or knives, and place upon the outside thereof, throughout, wings or thin pieces of wood or metal extending, horizontally and parallel from end to end, so as that by the motion of the screen and said wings a current of air shall be created The width and nearness of said wings to each other will depend upon the size of the screen. – Upon a screen of the diameter of four feet they may be of the width of six to eight inches, and within eight inches of each other over the whole of the outside of the screen and so varying in proportion and nearness as the cylinder of the screen is larger or smaller The screen with the wings is to be placed in a round case or chest a little larger than the screen itself and a narrow opening of the length of the cylinder must be left open for the current of air to pass off from the wings; the upper part of which opening must or may be about the centre of the cylinder and of the width of sixteen inches in a screen of the dimensions above given, the case is then to be placed in a large enclosure for the

[illegible]

7/21/1831 6608X better securing the dust which passes from the rags. When this
screen is thus constructed, it will be found that upon the rapid motion
of the cylinder the wings make a current of air, which carries
off the dust escaping from the rags through said opening & the
same is deposited in the larger enclosure.

My improvement consists only in putting said pieces of
wood or metal, called wings upon the outside of the common
duster or screen for cleaning rags, and so enclosing the
same in the case with an opening, as to create, by motion
of the cylinder, a current of air sufficient to carry off
the dust escaping from the rags; and it is for this im-
provement only that I ask for a patent.

Hartford July 4th 1831

George Carriel

Witnesses
Wm W. Ellsworth,
James Griswold 504 wds

Ex'd
[illegible]W.